United States Patent
Nielsen (10) Patent No.: US 9,035,498 B2
(45) Date of Patent: May 19, 2015

(54) ELECTRIC POWER CONTROL SYSTEM AND ELECTRIC POWER FACILITY COMPRISING THE ELECTRIC POWER CONTROL SYSTEM

(75) Inventor: Kaj Skov Nielsen, Issaquah, WA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 723 days.

(21) Appl. No.: 13/155,686

(22) Filed: Jun. 8, 2011

(65) Prior Publication Data

US 2011/0309683 A1    Dec. 22, 2011

(30) Foreign Application Priority Data

Jun. 16, 2010   (EP) ..................................... 10166146

(51) Int. Cl.
| | |
|---|---|
| *H02J 1/00* | (2006.01) |
| *H02J 3/00* | (2006.01) |
| *H02J 3/16* | (2006.01) |
| *F03D 7/02* | (2006.01) |

(Continued)

(52) U.S. Cl.
CPC ................ *H02J 3/16* (2013.01); *F03D 7/0284* (2013.01); *F03D 7/048* (2013.01); *F03D 9/005* (2013.01); *F05B 2270/337* (2013.01); *H02J 3/1821* (2013.01); *H02J 3/24* (2013.01); *H02J 3/383* (2013.01); *H02J 3/386* (2013.01); *Y02E 40/34* (2013.01); *Y02E 10/563* (2013.01); *Y02E 10/723* (2013.01); *Y02E 10/763* (2013.01); *H02J 3/382* (2013.01)

(58) Field of Classification Search
CPC ............................ F03D 7/0284; H02J 3/1821
USPC .......... 307/29, 71, 73, 74, 75, 84, 85; 290/44, 290/55
See application file for complete search history.

(56) References Cited

U.S. PATENT DOCUMENTS

| | | | | |
|---|---|---|---|---|
| 4,999,565 | A | * | 3/1991 | Nilsson ......................... 323/210 |
| 7,042,110 | B2 | | 5/2006 | Mikhail et al. |

(Continued)

FOREIGN PATENT DOCUMENTS

| | | |
|---|---|---|
| CN | 1630157 A | 6/2005 |
| CN | 101350525 A | 1/2009 |

(Continued)

OTHER PUBLICATIONS

Larsen (EP 2175540 A2).*

(Continued)

*Primary Examiner* — Rexford Barnie
*Assistant Examiner* — Rasem Mourad (57) ABSTRACT

An electric power control system is provided. The power control system includes a first node to which a plurality of power production entities are connectable for combining their power output signals as a first power signal, a transformer adapted to transformer the first power signal at the first node to a second power signal at a second node connectable to a load, the second power signal having a higher voltage than the first power signal, at least one capacitor connectable to the first node and/or to the second node, a control unit adapted to control the connection of the at least one capacitor to the first node and/or to the second node such that a power loss caused by transmission loss of the power output signals from the power production entities to the load is minimized.

17 Claims, 2 Drawing Sheets

(51) Int. Cl.
*F03D 7/04* (2006.01)
*F03D 9/00* (2006.01)
*H02J 3/18* (2006.01)
*H02J 3/24* (2006.01)
*H02J 3/38* (2006.01)

(56) References Cited

U.S. PATENT DOCUMENTS

| | | | |
|---|---|---|---|
| 7,071,579 B2 * | 7/2006 | Erdman et al. | 290/55 |
| 7,095,597 B1 * | 8/2006 | Cousineau | 361/20 |
| 7,606,638 B2 | 10/2009 | Fortmann et al. | |
| 7,994,658 B2 * | 8/2011 | Cardinal et al. | 307/84 |
| 8,355,829 B2 * | 1/2013 | Arinaga et al. | 700/297 |
| 2005/0040655 A1 * | 2/2005 | Wilkins et al. | 290/44 |
| 2009/0096211 A1 * | 4/2009 | Stiesdal | 290/44 |
| 2010/0207463 A1 * | 8/2010 | Fortmann et al. | 307/153 |

FOREIGN PATENT DOCUMENTS

| | | |
|---|---|---|
| CN | 101640419 A | 2/2010 |
| CN | 101719676 A | 6/2010 |
| DE | 102007017870 A1 | 10/2008 |
| EP | 689272 A1 * | 12/1995 |
| EP | 0689272 A1 | 12/1995 |
| EP | 1512869 A1 | 3/2005 |
| EP | 2161444 A2 | 3/2010 |
| EP | 2175540 A2 * | 4/2010 |
| WO | WO 9424752 A1 | 10/1994 |

OTHER PUBLICATIONS

Lennart (EP 689272 A1).*
Larsen et al. (EP 2175540A2).*
Lennart (EP 0689272 A1).*

* cited by examiner

FIG 2

ELECTRIC POWER CONTROL SYSTEM AND ELECTRIC POWER FACILITY COMPRISING THE ELECTRIC POWER CONTROL SYSTEM

CROSS REFERENCE TO RELATED APPLICATIONS

This application claims priority of European Patent Office application No. 10166146.0 EP filed Jun. 16, 2010, which is incorporated by reference herein in its entirety.

FIELD OF INVENTION

The present invention relates to an electric power control system for controlling plural power production entities. Further, the present invention relates to an electric power facility comprising plural power production entities and the electric power control system. In particular, the present invention relates to an electric power control system for controlling plural power production entities, wherein the electric power control system comprises at least one capacitor connectable to a node within the electric power control system.

ART BACKGROUND

An electric power facility may comprise plural power production entities, such as wind turbines, which may be connected at a point of common coupling (PCC) to provide their generated power to an utility grid network. In the US the term PCC may refer to the connection between the grid operator and the local power producer. So a point of common coupling may be at the MV side if the grid company owns the transformer. It may be right on the other side of the transformer on the HV side or it may be miles upstream if the local power producer had to install a line to get out to the wind power plant.

The wind turbines may in particular be variable speed wind turbines which may, depending on a load on the grid, require some VAr (voltage ampere reactive) control, in order to enhance the power quality or to comply with the interconnection agreement at the point of common coupling.

U.S. Pat. No. 7,071,579 B2 discloses a wind farm VAr (voltage ampere reactive, also referred to as var) support controller and a harmonics filter controller for a wind farm connected to a grid. The var support and harmonics filter is applied at the low voltage side of the grid between the wind turbine transformer and the wind farm transformer which transforms the low or medium voltage to a high voltage according to local regulations. The voltage (VAr) support is applied at the production entities (turbines), at the MV side of the substation transformer or at the HV side of the substation transformer to satisfy the requirements at the PPC point.

U.S. Pat. No. 7,042,110 B2 discloses a variable speed wind turbine, wherein a generator converter of the wind turbine controls the generator torque by a field orientation method. And the grid converter controls the grid characteristics like MW, Voltage (MVAr or $\cos(\phi)$) However, the var controller and $\cos(\phi)$ controller are not described in detail.

U.S. Pat. No. 7,606,638 B2 discloses a wind park with voltage control (MVAr or $\cos)\phi$)), wherein the park master has communication lines for controlling the wind energy installations in order to set the optimal combination of active capacitor banks and voltage references to the wind turbines to increase the power transmission to the network.

It has been observed that a power facility comprising plural power production entities may operate at less than optimal efficiency. Further, it has been observed that conventional control methods may not provide the flexibility to reach a higher level of efficiency There may be a need for an electric power control system for controlling a plurality of plural power production entities which distributes voltage (MVAr or $\cos(\phi)$) references to the individual power production entities in order to improve the efficiency of the power production facility. Further, there may be a need for an electric power facility comprising an electric power control system improved in particular regarding the efficiency of the electric power facility. Further, there may be a need for an electric power facility efficiently providing power under varying load conditions.

SUMMARY OF THE INVENTION

This need may be met by the subject matter according to the independent claims. Advantageous embodiments of the present invention are described by the dependent claims.

According to an embodiment an electric power control system comprises a first node to which plural power production entities are connectable for combining their power output signals as a first power signal; a transformer adapted to transform the first power signal at the first node to a second power signal at a second node connectable to a load, the second power signal having a higher voltage than the first power signal; at least one capacitor connectable to the first node and/or the second node; a control unit adapted to control the connection of the at least one capacitor to the first node and/or to the second node as well as transmitting voltage (MVAr or $\cos(\phi)$) references to the power production entities, such that a power loss caused by combining the power output signals at the first node and/or by supplying the second power signal to the load is minimized, in particular caused by transmission of power produced by the power production entities to the PCC point or the point of regulation can be minimized.

The first node may be a point of electric connection to which the plural power production entities are connectable or connected, for instance via plural switches which allow connecting or disconnecting each of the plural power production entities to the first node. Each of the plural power production entities may be any entity which is capable of producing electric energy, such as a wind turbine. The electric energy may be generated from mechanical energy, such as wind energy, wave energy, and/or energy of the sun.

Each of the plural power production entities may comprise an electromechanical transducer for converting mechanical energy to electric energy. In particular, each of the plural power production entities may comprise an electric generator. Further, each of the plural power production entities may comprise an AC/DC/AC converter for converting an electric power signal output from the generator to electric power signal compatible with the public grid, in particular having a predetermined frequency and having a predetermined voltage and/or current, in particular being a three phase power signal. Further, each of the plural power production entities may comprise a filter circuit for further improving the power quality at the power producing entity main terminals.

For each of the plural power production entities the operation voltage may be adjustable, the operation voltage representing the voltage of the power signal output by the power production entity. In particular, the operational voltage may be adjustable at the converter, in particular at the converter of a wind turbine.

The electric power of the plural power production entities is combined at the first node (as a first power signal having a particular voltage and having a particular current. The voltage as well as the current may vary according to a trigonometric function, such as sine or cosine with respect to time. The frequency of the varying first power signal may be for example 50 Hz or 60 Hz nominal.

The voltage and the current of the first power signal may not be in phase, but they may be phase-shifted relative to each other. The relative phase angle is referred to as $\phi$. Thus, the current may be ahead of the voltage by a phase $\phi$ or the other way round. The relative phase-shift $\phi$ between the current and the voltage of the first power signal may depend on electrical properties of each of the plural power production entities, the load to which the second power signal is connected and on other factors. If the load is for example purely resistive the voltage and the current of the first power signal may be in phase ($\phi=0$) such that they reverse their polarity at the same time. If, for example, the load is purely reactive then the voltage and the current of the first power signal may be 90° out of phase, i.e. $\phi=90°$.

The transferred power of an electric signal is the product of voltage and current of the electric signal. Thereby, also the relative phase relationship has to be taken into account such that the power equals voltage times current times cosine of the relative phase angle $\phi$. The quantity $\sqrt{3} \times I \times V \times \text{cosine}(\phi)$ may be called "real power" and the quantity $\sqrt{3} \times I \times V \times \text{sine}(\phi)$ may be called "reactive power" (in any formula, x stands for a multiplication). The quantity I×V is also referred to as "apparent power". Thereby, I denotes the current and V denotes the voltage of the first power signal The reactive power transferred from the load back to the power production facility is sometimes quantified by the unit Volt-Amperes reactive (VAr). In contrast, the real power is measured in the unity Watt (W).

If the load is for example purely reactive ($\phi=90°$) there is no net transfer of energy to the load. If the relative phase angle $\phi$ is in between 0 and 90°, at certain times there will be net transfer of energy to the load and at certain other times there will be net transfer from the load in a reverse direction.

The transformer may transform the first power signal to the second power signal having a higher voltage than the first power signal in order to allow more efficient transmission of the power signal via long distance electric lines.

The at least one capacitor may be any electric device that is capable of storing electric charges. For example, the capacitor may store the electric charges at two electrodes which are separated by a dielectric medium, wherein energy is stored in an electric field generated between the two electrodes. The at least one capacitor may exhibit a capacitive characteristics on a three phase power grid. It may be based on switched capacitors or other devises.

According to an embodiment the control unit may be adapted to adjust the amount of capacitance at some device either at the first node and/or at the second node.

Figure 2:
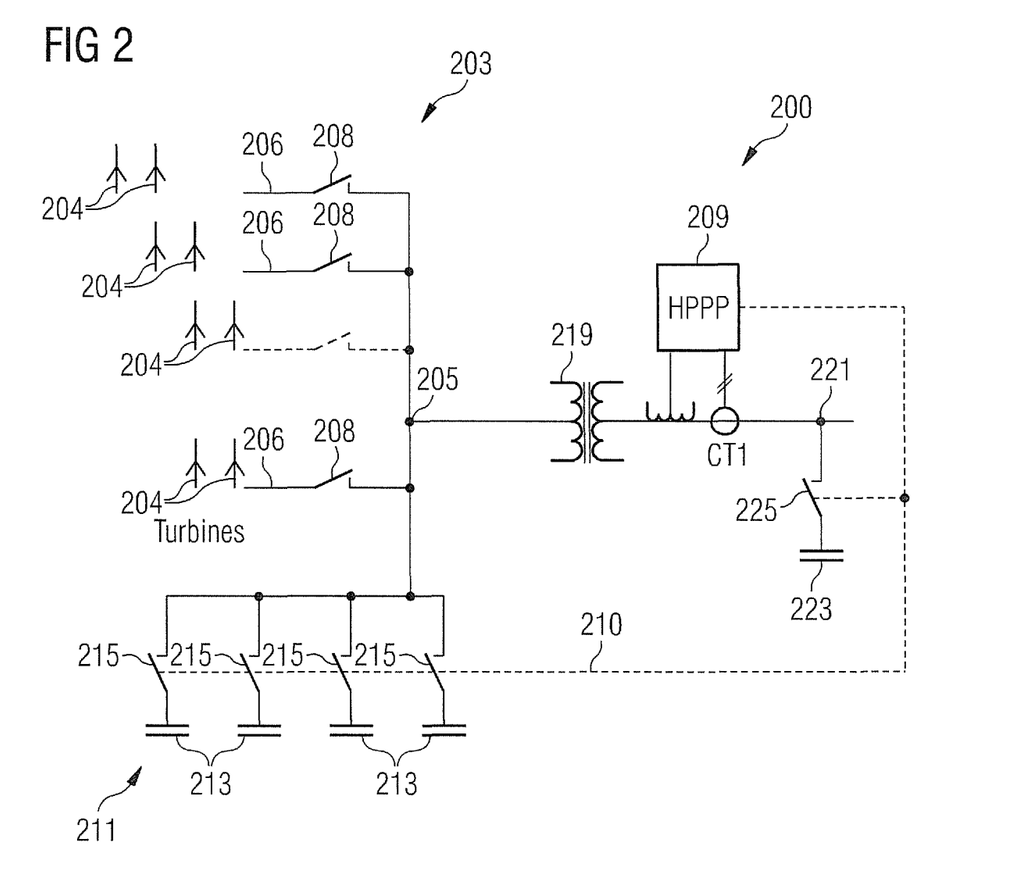
FIG. 2 schematically illustrates a power production facility according to an embodiment.

For each possible combination of active capacitor banks and voltage references transmitted to the turbines that satisfy the grid requirement, the controller may use a PSS E model (a product by Siemens) or any other model of the electrical infrastructure to calculate the resulting currents and voltages through out the circuit, and based on this model result, establish a value for MW loss from the power producing entities to the point of measurement (at the node 205 or 221 in FIG. 2 as dictated by the design.). The grid requirements may result in a very large reactive contribution being needed, so there may be multiple combinations of capacitors engaged satisfying the required exchange. During other operating conditions there may be a need for a very large reactive consumption, so very few combinations or maybe only regulation at the turbines may satisfy the required reactive power exchange.

For example, if the grid interconnection agreement requires that under a given condition the wind power plant shall produce 15 MVAr in order to be compliant, this could be achieved by:

Turbine contribution: +15 MVar; contribution of capacitors (211) delivered at Node(205): +0 MVAr; contribution of capacitors (223) at Node(221): 0 MVAr; or by Turbine contribution: +10 MVar; contribution of capacitors (211) delivered at Node(205): +5 MVAr; contribution of capacitors (223) at Node(221): 0 MVAr; or by Turbine contribution: +0 MVar; contribution of capacitors (211) delivered at Node(205): +15 MVAr; contribution of capacitors (223) at Node(221): 0 MVAr.

Other combinations may be possible depending on the size of the capacitors and the number of the capacitor. The controller (209) may consider all combinations and determine that combination with the least transmission loss and may set the connections of the capacitors accordingly.

Setting a voltage reference that generates 15 MVAr at the turbine level will increase the voltage on the LV side and reduce the losses here. But activating at least some capacitor banks will most likely result in a lower loss of energy from the production entities out to the measurement point.

The optimal solution may depend on the main grid voltage as well.

The grid interconnection may not be a simple permanent target value. It may for some interconnections be a dynamic voltage reference and for other interconnections be a dynamic MVAr or cos($\phi$) reference depending on what the grid operator needs at any given time. For some interconnections it may even be required that a given wind power plant be able to switch between different modes of operation like voltage control and MVAR/cos($\phi$) mode.

According to an embodiment it may be advantageous to connect the at least one capacitor to the first node. According to another embodiment it may be advantageous to connect the at least one capacitor to the second node. According to another embodiment it may be advantageous to connect the at least one capacitor neither to the first node nor to the second node.

A power loss may be defined according to an embodiment as a difference between an original power generated by the plural power production entities and a transmitted power transmitted to the load. Thereby, the original power may be the power of the plural power production entities which is generated by their respective generators before the power signal is supplied to the converter, the filter and other electric components of the power production entity, in particular the wind turbine. Thereby, at least a part of the power loss may occur by transmitting the power signals from the power production entity to the first node. Additionally or alternatively at least a part of the power loss may be due to the transmission of the first power signal at the first node to the second node, possibly caused by transforming the first power signal to the second power signal.

The control method performed by the control unit to control the power production facility including the plural power production entities and the at least one capacitor may thus improve the efficiency of the power production facility in addition to ensuring that the power signal adheres to local regulations.

According to an embodiment the at least one capacitor comprises at least one first capacitor connectable to the first node and at least one second capacitor connectable to the second node, wherein the control unit is adapted to control the connection of the first capacitor to the first node and to control the connection of the second capacitor to the second node such that the power loss is minimized. If more than one first capacitor and more than one second capacitor is provided, the control unit may be adapted to control the connections of all first capacitors to the first node and to control the connections of all second capacitors to the second node such that the power loss is minimized.

In the context of the present application the term first capacitor may comprise plural capacitors and the term second capacitor may comprise plural second capacitors.

Providing at least one capacitor connectable to the first node and/or at least one second capacitor connectable to the second node may provide more opportunities (by more combinations of connections of the first capacitor to the first node and connections of the second capacitor to the second node, in particular when plural first capacitors and plural second capacitors are provided) for reducing the power loss and may thereby improve the efficiency of the power production facility.

According to an embodiment the at least one first capacitor is connected to the first node and the at least one second capacitor is connected to the second node. According to another embodiment the at least one first capacitor is connected to the first node and the at least one second capacitor is disconnected from the second node. According to a still further embodiment the first capacitor is disconnected from the first node and the second capacitor is connected to the second node. According to a still further embodiment the first capacitor is disconnected from the first node and the second capacitor is also disconnected from the second node.

According to an embodiment the control system considers all possible combinations of connections of the first capacitor to the first node and the second capacitor to the second node and selects that mode of connection which will result in the least power loss of the power production facility.

According to an embodiment the power production entities allow adjusting their operation voltages of their power output signals, wherein the control unit is further adapted to control the operation voltages of the power production entities such that the power loss is minimized.

Adjusting the operation voltages of the power production entities may allow adjusting the power factor of each production entity. Thereby, the phase relationship between voltage and current of the power signal generated by each power production entity may be changed. In particular, the operation voltages of at least two of the production entities may be different from each other.

According to an embodiment the control unit is adapted to distribute voltage (MVAr or cos($\phi$)) references to the production entities and to ensure that the resulting power characteristics satisfies the interconnection requirements. Further, the control unit may be adapted to consider all possible combinations of connections of the first capacitor to the first node, the second capacitor to the second node and all combinations of operation voltages applied to the production entities and to determine that combination that results in the least power loss. Then, the connections of the first capacitor to the first node and the second capacitor to the second node and the adjustments of the operation voltages to the production entities may be performed according to the determined combination resulting in the least power loss. Thereby, the efficiency of the power production facility may be improved.

According to an embodiment the control unit is further adapted to control the connection(s) of the first capacitor and/or of the second capacitor and/or the operation voltages (MVAR or cos($\phi$)) of the power production entities such that the impact of natural frequency of the wind power plant infrastructure can be minimized.

The oscillation may occur at a frequency being a multiple of a nominal grid frequency. The nominal frequency may for example be 50 Hz or 60 Hz. The multiple of the nominal frequency may also be referred to as a higher harmonic frequency. The oscillation may occur within the network connecting the plural power production entities to the first node and the oscillation may additionally or alternatively also occur within the electric elements between the first node and the second node and/or the electric connections and elements between the second node and the load. According to an embodiment the oscillation may occur within the entire power production facility including the utility network connecting the power production facility to plural consumers representing the load. Oscillation at one or more natural frequencies may adversely affect the efficiency or reliability of the power production facility. So actively managing the capacitive elements on the wind power plants internal grid can contribute to reducing the adverse impact of inherent natural resonances or harmonics.

The oscillation may comprise a voltage and/or current oscillation, such that voltage and/or current may vary with time.

According to an embodiment the control unit is further adapted to control the connection of the first capacitor and/or of the second capacitor and/or the operation voltages (or at least one operation voltage) of the power production entities based on a model of the electric power control system predicting electrical properties.

In particular the at least one first capacitor may comprise plural first capacitors which are independently connectable to the first node. In particular, the at least one second capacitor may comprise plural second capacitors which are independently connectable to the second node. According to another embodiment the at least one first capacitor may be a capacitor which may be capable of storing an adjustable amount of charge. According to an embodiment the at least one second capacitor may be an electric device capable of storing an adjustable amount of charge. According to these embodiments the control unit may be adapted to adjust the amount of charge which is stored by the at least one first capacitor and/or by the at least one second capacitor. Thus, the control unit may be adapted (either by closing switches for a switched capacitor system or by setting a MVAr or voltage reference for a dynamic VAr device) to connect the first node to a charge storage having adjustable capacity (the capacity being controllable by the control unit) and may be further adapted to connect a charge storage to the second node, the charge storage having an adjustable capacity (the capacity being controllable by the control unit).

According to an embodiment the model may be a model of the entire power production facility including the plural power production entities, the plural connection paths from the power production entities to the first node, the electrical properties of the electrical components between the first node and the second node and may also include part of the utility grid providing the power to the load.

The model may for example comprise (complex) impedances within transmission paths of the power signals to the load. The model may comprise a PSS E model (a model built using a modelling software by Siemens) or any other similar modelling representation able to reside on the park controller platform. Further, the model may comprise a model of transmission lines and a model of electrical devices, such as capacitors, inductors and resistors. Further, the model may comprise a model of an AC/AC converter which may be comprised in a power production entity. Thereby, the control of the first capacitor and/or of the second capacitor and/or the operation voltages of the power production entities may be performed such that the power loss is minimized.

According to an embodiment the model comprises a harmonic analysis. A harmonic analysis may comprise analysis of oscillations within the power production facility or within at least parts of the power production facility and may also comprise an analysis of oscillations occurring within the power production facility and/or the utility grid. The harmonic analysis may comprise a Fourier analysis or any other representation of the harmonic characteristics of the electrical infrastructure. Thereby, oscillations may occur at a frequency corresponding to a multiple of a base frequency. The base frequency may be the frequency the local grid. Thereby, a frequency of oscillations adversely affecting the performance of the power production facility may be identified and connections of the first capacitor to the first node and the second capacitor to the second node may be identified (and/or changed) which at least partly prevent or damp the oscillation at this identified frequency.

According to an embodiment the control unit is further adapted to control the connection(s) of the first capacitor(s) and/or of the second capacitor(s) and/or the operation voltages of the power production entities based on a voltage and/or MVAr and/or a power factor measured at the first node and/or measured at the second node.

By measuring the voltage and the current at the first node the power supplied to the first node may be determined. Further, by measuring the current and the voltage at the second node the power delivered to the second node may be determined. Further, it may be possible to measure the power output from each individual power production entity for example by measuring the power output from the respective generator. Thereby, it may be possible to determine the power loss by measured values. Thereby, it may be easier to minimize the power loss. Further, the phase relationship between voltage and current may be measured in order to derive the power factor at the first node and/or the second node. By feeding back the measured values a control of the connection mode of the first capacitor and the second capacitor and a control of the adjustment of operation voltages to the power production entities may be improved.

According to an embodiment the control unit is adapted to derive the power loss for every possible combination of a first number of the at least one first capacitor connected to the first node and a second number of the at least one second capacitor connected to the second node and the voltage transmitted to the production entities; and to control the connections of the at least one first capacitor and/or the at least one second capacitor and selecting a voltage reference according to a combination having a minimal power loss. The power loss may be determined for each combination using a model of the power production facility as detailed above. Thereby the control of the power production facility may be improved to enhance its performance. The first number and/or the second number may also be zero.

According to an embodiment the control unit is further adapted to derive the power loss for every possible combination of operation voltages adjusted at the power production entities; and to control the connections of the at least one first capacitor and/or the at least one second capacitor and/or to adjust the operation voltages of the power production entities according to a combination having a minimized power loss. Thereby, the efficiency of the power production facility may even further be improved.

According to an embodiment the control unit is further adapted to change the connection(s) of the at least one first capacitor to the first node and/or to change the connection(s) of the at least one second capacitor to the second node upon change of a sum of the power output signals of the power production entities and/or upon change of the load. Thus, the control unit may dynamically control the power production facility in order to react to changing power output signals generated by the power production entities, such as upon changing wind conditions. For this the control unit may continuously or repeatedly monitor the electrical properties of the power production facility in order to appropriately control the connection of the first capacitor to the first node and the second capacitor to the second node and to appropriately adjust the operational voltages of the production entities.

According to an embodiment an electric power facility comprises an electric power control system according to an embodiment as described above and plural power production entities connected for combining their power output signals at the first node. Thereby, the electric power facility may have an improved performance due to the improved control by the electric power control system, thereby improving their efficiency.

According to an embodiment at least one of the plural power production entities comprises a wind turbine, a photo voltaic cell, and/or a wave power system. Thus, the power production entities or at least one of the plural power production entities may generate its electric energy from wind energy, from energy from the sun and/or from energy contained in waves such as water waves or tidal currents. Each of the power production entities may comprise a generator or an electromechanical transducer for transforming mechanical energy into electric energy. In particular, the plural power production entities may comprise plural wind turbines.

According to an embodiment at least one of the plural power production entities comprises a device (in particular a full power converter) capable for adjusting its operation voltage of its power output. The device (e.g. the converter) may be adapted to convert a primary power signal generated by an electric generator (which may be a signal having a varying frequency and a varying voltage amplitude) to a secondary power signal having a grid frequency and having a predetermined voltage amplitude. In particular, the voltage amplitude of the secondary power signal output from the converter may be adjustable as an operation voltage reference applied to the converter. Thereby, the operation voltage of the power production entities may easily be adjusted for simplifying the control for improving the performance of the power facility.

The voltage (MVAr or $\cos(\phi)$) reference for the wind power plant can be a static value dictated by the grid operator only seldom changed by an operator or it can be dynamically issued automatically to the wind power plant control system from an external source via OPC, MODBUS, TCP or other data transfer protocol, or hard wired interface. The wind power plant controller (HPPP-209) may follow the assigned reference to the extent possible. If the actual voltage at the point of measurement is lower than the assigned voltage reference then the wind power plant controller may issue voltage references to the power production entities resulting in MVAr export from the wind power plant in order to boost the voltage. If the actual grid voltage at the point of measurement is higher than the assigned voltage reference the wind power plant controller may issue voltage references that may cause reactive power import in order to pull the voltage lower. The amount of MVAR exchanged may depend on the voltage delta value, the voltage droop control settings and the grid impedance etc. Typically the amount of MVAr exchanged may be proportional to the voltage delta value within the reactive capability of the wind power plant.

According to an embodiment a method of supplying electric energy to a load is provided, wherein the method comprises: generating power output by a plurality of power production entities; combining the power output at a first node as a first power signal; transforming the first power signal to a second power signal at a second node, the second power signal having a higher voltage than the first power signal; supplying the second power signal to a load; and controlling a connection of at least one capacitor connectable to the first node and/or to the second node such that a power loss incurred by the transmission from the MV to the HV and out to the load is minimized. Regulation based on minimizing the MW loss and based on reducing the impact of harmonics was described and is utilized according an embodiment. Using a model based controller it would also be possible in other embodiments to weigh contributions from both criteria and select the most desirable combination to be applied in a given condition. Thereby, the efficiency of the power production facility may be improved.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described by reference to the accompanying drawings.

DETAILED DESCRIPTION

The illustration in the drawing is schematically. It is noted that in different figures, similar or identical entities are provided with the same reference signs or with reference signs, which are different from the corresponding reference signs only within the first digit.

Figure 1:
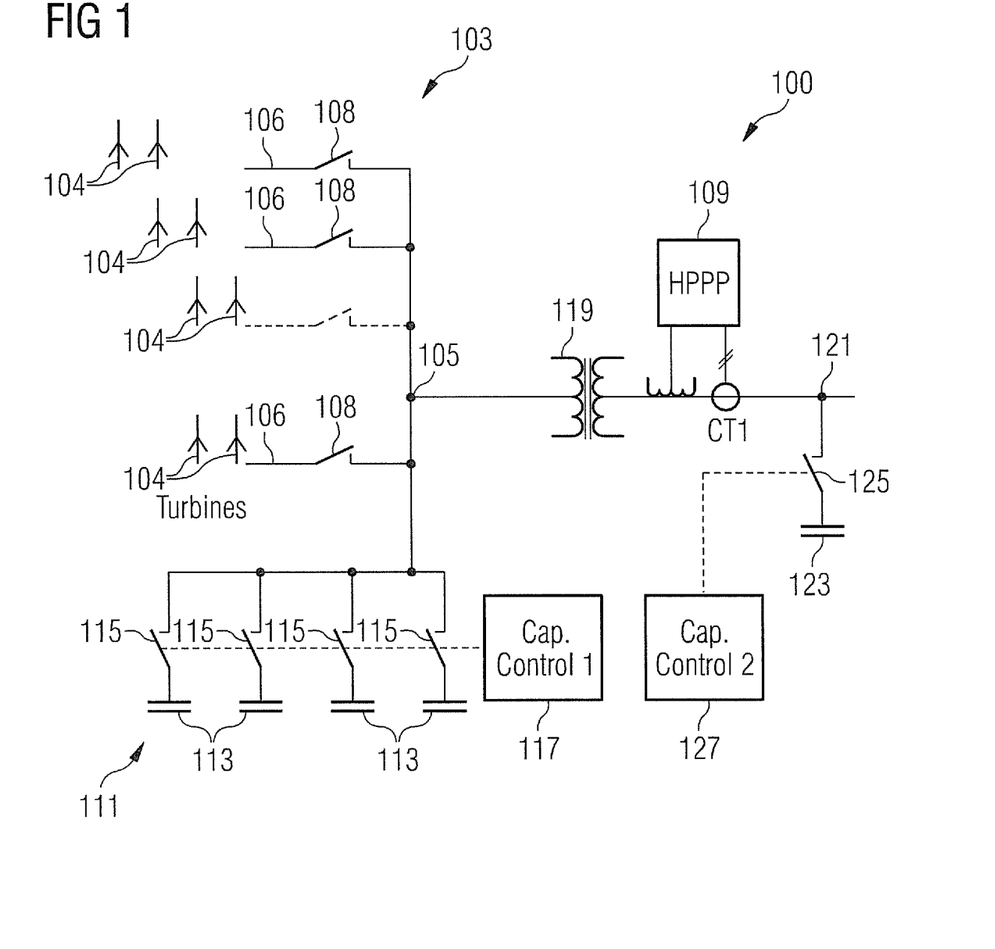
FIG. 1 schematically illustrates a power production facility according to existing control strategy.

FIG. 1 schematically illustrates a power production facility 100 according to a typical existing installation with semi independent control algorithms for the wind power plant controller and for the MV capacitor banks and for the HV capacitor banks. The power production facility 100 comprises a set 103 of wind turbines 104 which are connected in parallel to combine their power output signal to a connection point 105. Capacitor controls 117 and 127 and HPPP 109 are independent from each other. Thus, no optimal combination of capacitor connections to connection point 105 and connection point 121 can be set.

FIG. 2 schematically illustrates an embodiment 200 of a power production facility with combined turbine and capacitor bank controls. As the power production facility 100 illustrated in FIG. 1 the power production facility 200 illustrated in FIG. 2 comprises a plurality 203 of wind turbines 204 which are connectable to a first node 205.

Each wind turbine 204 comprises a wind turbine tower having a nacelle mounted at the top of the tower, wherein the nacelle includes a hub at which plural rotor blades are mounted. Impacting wind causes the rotor blades to move such that the hub connected to a rotor shaft is rotated. The rotor shaft in turn transfers its mechanical energy to a generator comprised in each of the wind turbines 204. The generator of each turbine 204 outputs a primary power signal which is converted by a (not illustrated) converter to a signal having a grid frequency and adjustable voltage amplitude. This power signal may further be filtered by a filter component within the turbine 204. The wind turbines 204 may additionally comprise individual transformers to transform the filtered power signal to a voltage of several kV, such as 20 kV to 40 kV.

The thus filtered power signal is supplied via a line 206 to a switch 208. By activating the switch 208 selected wind turbines 204 may be connected to the first node 205 or disconnected from the first node 205. Activating individual switches 208 may be performed by the control system 209 via not indicated control lines or may be connected permanently with the switch only representing a grid protection device like over current or ground fault protection devise. Thereby, the signal supplied to the first node 205 may lie at a medium voltage (several 10 kV).

Also connectable to the first node 205 is a set 211 of capacitors 213. Each capacitor 213 is connectable to the first node 205 via a switch 215 independently from the other capacitors 213.

The first power signal supplied to the first node 205 is transformed by a transformer 219 to a second power signal supplied to the second node 221, wherein the second power signal has a higher voltage than the first power signal supplied to the first node 205. A capacitor 223 is connectable to the second node 221 by activating a switch 225.

In other embodiments the set of capacitors 211 comprises one or more capacitors, and in one embodiment the capacitor 223 connectable to the second node 221 comprises one or more additional capacitors. In other embodiments one or more capacitors are only connectable to the first node 205 or to the second node 221 but not connectable to both nodes 205, 121.

The high performance park pilot (HPPP) 209 is implemented in the illustrated embodiment on the high voltage side of the transformer 219. The HPPP is capable of regulating the voltage at each individual turbine 204 (via not illustrated control lines) and measures/monitors the voltage and/or the current (reactive or/and active components) and/or the power factor of the grid (by not illustrated sensor and via data lines). In particular, the HPPP 209 adjusts the voltages at each individual turbine such that the power characteristics at the measurement point satisfies the grid interconnection agreement.

The first power signal supplied to the first node 205 is transformed by the transformer 219 and supplied to a second node 221. Connectable to the first node 205 is a set 211 of capacitors 213 via switches 215. Connectable to the second node 221 is a capacitor 223 by activating a switch 225.

Different from the embodiment 100 illustrated in FIG. 1 the HPPP 209 of power production facility 200 is adapted to control, via control line 210, activation of the switches 215 to connect the capacitors 213 to the first node 205, to activate the switch 225 to connect the capacitor 223 to the node 221 and is also adapted to regulate the operation voltages of the individual turbines 204 via not illustrated control lines. Thereby, an integrated solution of capacitors control and operation voltage control is provided by the HPPP 209.

The configuration of additional capacitor banks (connectable to the first and/or the second node) may depend on local requirements and the controls for these capacitor banks may be based on a voltage/MVAr or power factor algorithm. The capacitor banks 211, 223 may be located on each side of a wind park transformer 229 on the medium voltage side (node 205) and the high voltage side (second node 221). The HPPP 209 may be adapted to control the voltage (reactive power/power factor/cosine($\phi$)/tangent($\phi$)) at the turbine level of each individual wind turbine 204 and may be adapted to also control the capacitor banks 211 and 223 as an integrated solution. The control algorithm may be based on any scheme allowed or required by local regulations but in addition to complying with the grid code as the primary constraint the controller shall optimize the configuration based on grid loss and/or grid harmonic resonance. According to an embodiment the HPPP controller 209 may incorporate a model of the grid (the level of resolution may vary) and based on this model the control algorithm may optimize the distribution of voltage between the available systems in the entire grid.

By implementing an even more detailed model of the grid in the HPPP a harmonics analysis may be performed by the HPPP. If any other combination of capacitor banks will result in a more favourable harmonic situation this configuration may be activated provided that the power loss is minimized.

A more favourable harmonics situation may not always mean a smaller total harmonic distortion (THD) but may simply mean that the network is pushed more towards a resonance frequency that causes less conflict with the installed equipment or equipment outside the production facility.

The invention may be applied to any distributed energy production facility like e.g. photo voltaic, wind power plant and wave power. The central high performance park pilot (HPPP) 209 may be adapted to control the voltage of the individual turbine in terms of the reactive power and/or power factor and it may further control one or more capacitor banks 211, 223 connectable to each side of a park transformer 219 in order to optimize the configuration of the capacitor banks based on grid loss or transmission loss and/or grid harmonic resonance.

Having several series of capacitor banks to be directly controlled by a park controller may improve the controllability of the wind power plant voltage and grid harmonic resonances and may minimize grid loss as above and harmonic resonances. The ability to control capacitor banks based on the most optimal harmonics condition could in some cases eliminate the need for harmonic filters at the sub-station in the power production grid. Having the control algorithm of the park controller 209 based on a model of the power production grid the control algorithm can optimize the distribution of voltage between the available systems in the entire grid.

According to an embodiment a set of capacitors 211 comprises four capacitor banks connectable to the first node 205 and the set of capacitors 123 comprises four capacitor banks connectable to the second node 221. According to an embodiment the HPPP 209 determines for all combinations of 0, 1, 2, 3 and 4 capacitor banks connected to the first node 105 and 0, 1, 2, 3 and 4 capacitor banks connected to the second node the power loss. Then the HPPP 209 weighs contributions from both criteria and selects the most desirable combination to be applied. Further, several of these combinations may be disregarded because they would cause non-compliance for the interconnection point. The HPPP 209 may determine the combination having the minimal power (transmission) loss. The HPPP 209 may then activate the switches 215, 225 such that the minimal loss combination is established.

In addition to the capacitor combinations the reactive range of the turbines should be considered making it possible to potentially add a few additional combinations of capacitors to be acceptable and compliant. Based on a model of the production facility 200 it may be possible for each of the acceptable capacitor combinations to calculate a potential grid loss for the specific conditions on this location. In order to minimize the grid loss, the capacitor combination with the lowest grid (transmission) loss may be carried out and as production levels and grid voltages change new simulations may be performed to continue to operate with the lowest loss possible. Capacitor banks could be substituted for any kind of dynamic VAR control changing the simulation to look at specific settings for VAR support for each location as a numeric value instead of a capacitor bank configuration. If any combination of capacitor banks results in a more favourable harmonic situation this configuration may be activated by activating the corresponding switches. For any combination of capacitors critical resonance frequencies may be established by the model based controller 209. If for a specific grid it is determined that anything below the 12th harmonics is critical, the model based regulator 209 may make it possible to select the combination of capacitor banks that shifts the resonance frequency away from the critical area. This may eliminate the need for expensive filter equipment in the sub-station or at the turbines, as well as reduced down time for equipment.

It should be noted that the term "comprising" does not exclude other entities or steps and "a" or "an" does not exclude a plurality. Also entities described in association with different embodiments may be combined. It should also be noted that reference signs in the claims should not be construed as limiting the scope of the claims.

The invention claimed is:

1. An electric power control system, comprising:
a first node to which a plurality of power production entities are connectable for combining their power output signals as a first power signal;
a transformer that transforms the first power signal at the first node to a second power signal at a second node connectable to a load, the second power signal having a higher voltage than the first power signal;
at least one capacitor connectable to the first node;
at least one further capacitor connectable to the second node; and
a control unit that regulates respective operation voltages of individual power production entities of the plurality of power production entities, and in dependence thereof, controls a first connection of the at least one capacitor to the first node and further controls a second connection of the at least one further capacitor to the second node to selectively form an optimal combination connection of the at least one capacitor to the first node and of the at least one further capacitor to the second node, wherein the optimal combination connection is effective to minimize a power loss caused by transmission loss of the power output signals from the power production entities.

2. The electric power control system according to claim 1, wherein the control unit further controls the first connection of the at least one capacitor and the second connection of the at least one further capacitor, and the operation voltages of the power production entities such that a natural frequency in an electrical collection circuit is damped, by identifying and/or changing the first connection of the at least one capacitor to the first node and by identifying and/or changing the second connection of the at least one further capacitor to the second node.

3. The electric power control system according to claim 1, wherein the control unit further controls the first connection of the at least one capacitor or the second connection of the at least one further capacitor, or the operation voltages of the power production entities such that a natural frequency in an electrical collection circuit is damped.

4. The electric power control system according to claim 1, wherein the control unit further controls the first connection of the at least one capacitor and the second connection of the at least one further capacitor and the operation voltages of the plurality of power production entities based on a model of the electric power control system predicting electrical properties.

5. The electric power control system according to claim 1, wherein the control further controls the first connection of the at least one capacitor or the second connection of the at least one further capacitor or the operation voltages of the plurality of power production entities, based on a model of the electric power control system predicting electrical properties.

6. The electric power control system according to claim 4, wherein the model comprises a harmonic analysis.

7. The electric power control system according to claim 5, wherein the model comprises a harmonic analysis.

8. The electric power control system according to claim 1, wherein the control unit further controls the first connection of the at least one capacitor or the second connection of the at least one further capacitor or the operation voltages of the power production entities based on a voltage or a current or a power factor measured at the first node or measured at the second node.

9. The electric power control system according to claim 1, wherein the control unit further controls the first connection of the at least one capacitor and the second connection of the at least one further capacitor and the operation voltages of the power production entities based on a voltage and a current and a power factor measured at the first node and measured at the second node.

10. The electric power control system according to claim 1, wherein the control unit derives the power loss for every possible combination of a first number of the at least one capacitor connected to the first node and a second number of the at least one further capacitor connected to the second node and to control the connections of the at least one capacitor and the at least one further capacitor according to the combination having a minimal power loss.

11. The electric power control system according to claim 10, wherein the control unit derives the power loss for every possible combination of operation voltages adjusted at the plurality of power production entities, and to control the connections of the at least one capacitor and the at least one further capacitor and to adjust the operation voltages of the power production entities according to the combination having a minimized power loss.

12. The electric power control system according to claim 10, wherein the control unit derives the power loss for every possible combination of operation voltages adjusted at the plurality of power production entities, and to control the connections of the at least one capacitor or the at least one further capacitor or to adjust the operation voltages of the power production entities according to the combination having a minimized power loss.

13. The electric power control system according to claim 1, wherein the control unit is further configured to change the first connection of the at least one capacitor to the first node and to change the second connection of the at least one further capacitor to the second node based on a change of a sum of the power output signals of the power production entities and/or a change of the load.

14. An electric power facility comprising: an electric power control system, comprising: a first node to which a plurality of power production entities are connectable for combining their power output signals as a first power signal, a transformer that transforms the first power signal at the first node to a second power signal at a second node connectable to a load, the second power signal having a higher voltage than the first power signal, at least one capacitor connectable to the first node via a first switchable connection, at least one further capacitor connectable to the second node via a second switchable connection; and a control unit that regulates respective operation voltages of individual power production entities of the plurality of power production entities, and in dependence thereof, controls a switching on and switching off of said first connection of the at least one capacitor to the first node, and further controls a switching on and switching off of said second connection of the at least one further capacitor to the second node to selectively form an optimal combination connection of the of the at least one capacitor and of the at least one further capacitor to the second node, wherein the optimal combination connection is effective to minimize a power loss caused by transmission loss of the power output signals from the power production entities; and the plurality of power production entities connected for combining their power output signals at the first node.

15. The electric power facility according to claim 14, wherein at least one of the plural power production entities comprises a wind turbine, a photo voltaic cell and a wave power system or tidal current.

16. The electric power facility according to claim 14, wherein at least one of the plural power production entities comprises a device capable for adjusting an operation voltage of a power output.

17. A method of supplying electric energy to a load, the method comprising:
generating power output signals by a plurality of power production entities;
combining the power output signals at a first node as a first power signal;
transforming the first power signal to a second power signal at a second node, the second power signal having a higher voltage than the first power signal;
supplying the second power signal to a load; and
regulating operation voltages of individual power production entities of the plurality of power production entities, and in dependence thereof, controlling a first connection of at least one capacitor connectable to the first node, and further controlling a second connection of at least one further capacitor connectable to the second node to selectively form a combination connection of the at least one capacitor to the first node and of the at least one further capacitor to the second node, wherein the optimal combination connection is effective to minimize a power loss caused by transmission loss of the power output signals from the power production entities.

* * * * *